(12) United States Patent
Weng et al.

(10) Patent No.: US 10,250,801 B2
(45) Date of Patent: Apr. 2, 2019

(54) CAMERA SYSTEM AND IMAGE-PROVIDING METHOD

(71) Applicant: Institute For Information Industry, Taipei (TW)

(72) Inventors: Ming-Fang Weng, Kinmen County (TW); Ching-Wen Lin, New Taipei (TW)

(73) Assignee: Institute For Information Industry, Taipei (TW)

(*) Notice: Subject to any disclaimer, the term of this patent is extended or adjusted under 35 U.S.C. 154(b) by 28 days.

(21) Appl. No.: 15/487,420

(22) Filed: Apr. 13, 2017

(65) Prior Publication Data

US 2018/0302553 A1 Oct. 18, 2018

(51) Int. Cl.
| | |
|---|---|
| *H04N 5/232* | (2006.01) |
| *G06T 7/194* | (2017.01) |
| *G06T 7/77* | (2017.01) |
| *G06T 7/73* | (2017.01) |

(52) U.S. Cl.
CPC ......... *H04N 5/23222* (2013.01); *G06T 7/194* (2017.01); *G06T 7/74* (2017.01); *G06T 7/77* (2017.01); *G06T 2207/20021* (2013.01); *G06T 2207/20076* (2013.01); *G06T 2207/30201* (2013.01); *G06T 2207/30244* (2013.01)

(58) Field of Classification Search
CPC .... H04N 5/23222; H04N 5/232; G06T 7/194; G06T 7/74; G06T 7/77; G06T 7/0042; G06T 7/2033; G06T 2207/20076; G06T 2207/30244; G06T 2207/30201; G06T 2207/20021
See application file for complete search history.

(56) References Cited

U.S. PATENT DOCUMENTS

| | | | | |
|---|---|---|---|---|
| 8,548,254 | B2 * | 10/2013 | Ishikawa | G06K 9/3275 |
| | | | | 358/488 |
| 9,846,963 | B2 * | 12/2017 | Patkar | G06T 7/73 |
| 9,916,689 | B2 * | 3/2018 | Rhee | G06T 19/006 |
| 2017/0018086 | A1 * | 1/2017 | Zhang | H04N 5/232 |
| 2017/0256068 | A1 * | 9/2017 | Wang | G06T 7/80 |

\* cited by examiner

*Primary Examiner* — Luong T Nguyen
(74) *Attorney, Agent, or Firm* — Skaar Ulbrich Macari, P.A.

(57) ABSTRACT

A camera system and an image-providing method are disclosed to overcome that conventional cameras cannot make a decision by themselves as for whether and/or how to capture images. The disclosed camera system includes a camera for capturing images and a computer device used to calculate an estimated camera location and pose for the camera. The camera system also includes a location adjusting device and a pose adjusting device to adjust the camera to the estimated camera location and pose.

20 Claims, 11 Drawing Sheets

CAMERA SYSTEM AND IMAGE-PROVIDING METHOD

FIELD

The present invention relates to a camera system and an image-providing method. More specifically, the present invention relates to an automatic camera system and an automatic image-providing method.

BACKGROUND

A camera is an optical instrument for capturing and/or recording images, which people would like to keep as a memory. Such images may be individual still photographs or sequences of images constituting videos or movies, depending on people's demand Various Cameras have been developed but all of them are substantially passive image-capturing instruments, which only work according to user's manipulations and/or instructions. A key factor is that such conventional cameras cannot make a decision by themselves as for whether and/or how to capture images.

Because of the factor, such conventional cameras may inconvenience a user. For example, if the user intends to capture an image in which he/she appears but cannot manipulate the cameras by himself/herself, he/she has to set a timer to defer triggering the shutter of the cameras, ask someone to capture the image, or use various selfie tools such as a selfie stick to capture the image. Moreover, since deciding how to capture images is made by the user, there is always a risk of capturing an undesired image, especially if the user is not a professional photographer. In view of this, it is important to provide a solution such that a camera is able to make a decision by itself as for whether and/or how to capture images.

SUMMARY

The disclosure includes a computer device for calculating an estimated camera location and an estimated camera pose. The computer device may comprise a storage and a processor electrically connected to the storage. The storage may be configured to store a plurality of feature models based on a plurality of reference images. Each of the feature models may comprise a plurality of reference feature points. The processor may be configured to calculate a plurality of initial feature points of an initial image and a plurality of respective three-dimensional coordinates thereof. The initial image may correspond to an initial camera location and an initial camera pose. The processor may also be configured to compare a plurality of feature differences, each of which is between the initial feature points of the initial image and the reference feature points of the respective feature models, to decide a feature model candidate from the feature models. The feature model candidate may correspond to a minimum of the feature differences. The processor may also be configured to decide an estimated camera location and an estimated camera pose based on a projection of the three-dimensional coordinates of the initial feature points of the initial image in a case where a plurality of feature points of an estimated image approach the reference feature points of the feature model candidate, wherein the estimated image is produced based on the estimated camera location and the estimated camera pose.

The disclosure also includes a camera system. The camera system may comprise the above-mentioned computer device, a camera, a location adjusting device and a pose adjusting device. The camera may be electrically connected to the computer device and configured to provide the initial image based on the initial camera location and the initial camera pose, and to provide the estimated image based on the estimated camera location and the estimated camera pose. The location adjusting device may be electrically connected to the computer device and operably connected to the camera, and configured to adjust the camera to the initial camera location and the estimated camera location respectively. The pose adjusting device may be electrically connected to the computer device and operably connected to the camera, and configured to adjust the camera to the initial camera pose and the estimated camera pose respectively.

The disclosure further includes a calculation method for calculating an estimated camera location and an estimated camera pose of a camera. The calculation method may comprise:

calculating a plurality of initial feature points of an initial image and a plurality of respective three-dimensional coordinates thereof by a computer device, wherein the initial image corresponds to an initial camera location and an initial camera pose;

comparing a plurality of feature differences, each of which is between the initial feature points of the initial image and a plurality of reference feature points of each of a plurality of feature models, to decide a feature model candidate from the feature models by the computer device, wherein the feature models are stored in the computer device and the feature model candidate corresponds to a minimum of the feature differences; and calculating the estimated camera location and the estimated camera pose based on a projection of the three-dimensional coordinates of the initial feature points of the initial image by the computer device in a case where a plurality of feature points of an estimated image approach the reference feature points of the feature model candidate, wherein the estimated image is produced based on the estimated camera location and the estimated camera pose.

The disclosure additionally includes an image-providing method. The image-providing method may comprise the above-mentioned calculation method and the following steps of:

providing the initial image by a camera based on the initial camera location and the initial camera pose and providing the estimated image by the camera based on the estimated camera location and the estimated camera pose, respectively;

adjusting the camera to the initial camera location and the estimated camera location respectively by a location adjusting device; and adjusting the camera to the initial camera pose and the estimated camera pose respectively by a pose adjusting device.

The estimated camera location calculated by the proposed computer device can indicate where a camera shall be located for capturing images, while the estimated camera pose calculated by the proposed computer device can indicate what pose the camera shall hold for capturing such images. Therefore, the proposed computer device enables the proposed camera system to make a decision by itself as for how to capture images.

The location adjusting device enables the camera to move to the estimated camera location automatically and the pose adjusting device enables the camera to pose as the estimated camera pose automatically. Therefore, the proposed camera system may make a decision by itself as for whether to capture images because the camera is ready for capturing images once it has moved to the estimated camera location and posed as the estimated camera pose.

The estimated camera location and the estimated camera pose are calculated depending on the feature models stored in the proposed computer device, which have been produced based on a plurality of reference images. A user can decide a composition of desired image(s) by assigning related images into the reference images or directly storing related feature model into the proposed computer device. In such a way, the proposed camera system is able to capture the desired image(s) for the user, whether the user is a professional photographer or not.

Consequently, the proposed computer device and camera system, and related calculation method and image-providing method indeed provide a good solution such that a camera is able to make a decision by itself as for whether and/or how to capture images.

What described above presents a summary of the invention (including the problem to be solved, the ways to solve the problem and the effect of the invention) to provide a basic understanding of the invention. However, what described above is not intended to contemplate all aspects of the invention. Additionally, what described above is neither intended to identify key or essential elements of any or all aspects of the invention, nor intended to describe the scope of any or all aspects of the invention. This summary is provided only to present some concepts of some aspects of the invention in a simple form and as an introduction to the following detailed description.

The detailed technology and preferred embodiments implemented for the subject invention are described in the following paragraphs accompanying the appended drawings for people skilled in the art to well appreciate the features of the invention.

DETAILED DESCRIPTION

The example embodiments described below are not intended to limit the invention to any specific environment, example, embodiment, applications, structures, processes or steps described in these example embodiments. In the attached drawings, elements unrelated to the invention are omitted from depiction; and dimensions and dimensional relationships among individual elements in the attached drawings are only exemplary examples and are not intended to limit the invention. Unless stated particularly, same (or similar) element numerals may correspond to same (or similar) elements in the following description.

Figure 1:
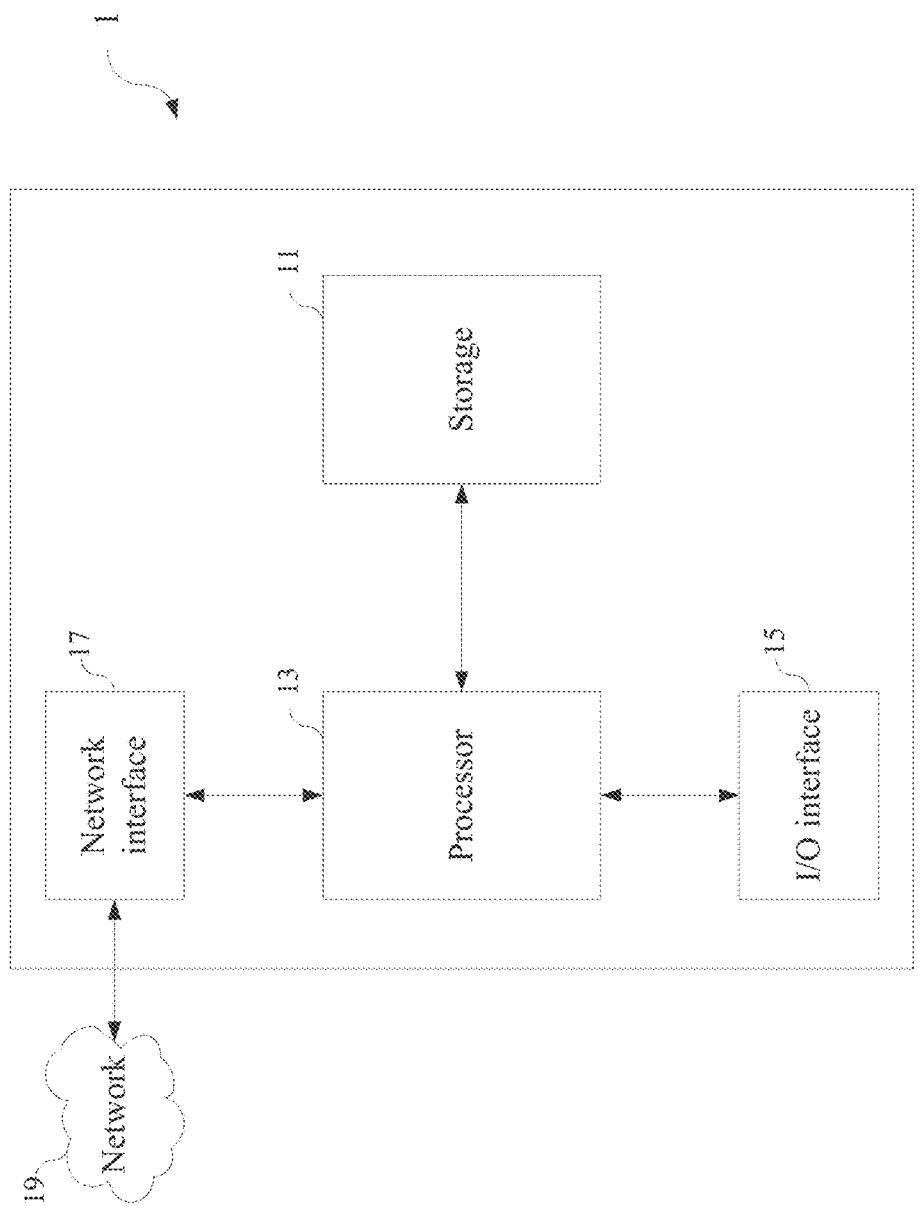
FIG. 1 illustrates an architecture of a computer device according to one or more embodiments of the invention.

FIG. 1 illustrates an architecture of a computer device for calculating an estimated camera location and an estimated camera pose according to one or more embodiments of the invention. However, the computer device illustrated in FIG. 1 is only provided as an exemplary example, but not to limit the invention. Referring to FIG. 1, a computer device 1 may comprise a storage 11, a processor 13, an optional I/O interface 15 and an optional network interface 17 among others. The storage 11, the processor 13, the optional I/O interface 15 and the optional network interface 17 may be electrically connected with each other via other components (e.g., via various kinds of buses) (i.e., indirectly electrically connected with each other), or may be electrically connected with each other without any other components therebetween (i.e., directly electrically connected with each other). Through the direct connection or the indirect connection, signal transmission and data exchange can be accomplished among the storage 11, the processor 13, the optional I/O interface 15 and the optional network interface 17.

The processor 13 may be a central processing unit (CPU) of a common computer device/computer, and may be programmed to interpret computer instructions, process data in computer software, and execute various operation procedures. The CPU may be a processor comprised of multiple independent units, or a microprocessor comprised of one or more integrated circuits (ICs).

The storage 11 may comprise any of various storage units of common computer devices/computers. The storage 11 may comprise a first-level memory (a.k.a. a primary memory or an internal memory), which is usually simply called a memory, directly communicating with the CPU. The CPU can read instruction sets stored in the memory and execute theses instruction sets if necessary. The storage 11 may also comprise a second-level memory (a.k.a. an auxiliary memory or an external memory), which communicates with the CPU not directly but through an I/O channel of the memory and transmits data to the first-level memory via a data buffer. Data stored in the second-level memory will not be lost when the power is turned off (i.e., being non-volatile). The second-level memory may be, e.g., any of various kinds of hard disks, compact disks (CDs) and so on. The storage 11 may also comprise a third-level storage device, i.e., a storage device that can be directly plugged into or removed from the computer (e.g., a mobile disk).

The optional I/O interface 15 may comprise various input/output elements of a common computer device/computer for receiving data from and transmitting data to the outside, for example but not limited to, a mouse, a trackball, a touch panel, a keyboard, a scanner, a microphone, a user interface (UI), a screen, a touch screen, a projector and so on.

The optional network interface 17 may comprise at least one physical network interface card of a common computer device/a computer for use as an interconnection point between the computer device 1 and a network 19. The network 19 may be a private network (e.g., a local area network (LAN)) or a public network (e.g., the Internet). The optional network interface 17 enables the computer device 1 to communicate with and exchange data with other electronic devices on the network 19 either in a wired way or wirelessly depending on different needs. In some embodiments, there may also be a switching device, a routing device or the like between the network interface 17 and the network 19.

The storage 11 may be configured to store one or more feature models based on one or more reference images before the processor 13 calculates an estimated camera location and an estimated camera pose of a camera. Each of the reference images may comprise a plurality of reference feature points. In some embodiments, the processor 13 may calculate the feature models by itself based on the reference images and then store the same into the storage 11 in advance. In some embodiments, a user may control the processor 13 via the optional I/O interface 15 or the optional network interface 17 to store the feature models from the outside into the storage 11 in advance. In some embodiments, the processor 13 may automatically search the feature models on the network 19 via the optional network interface 17 and then store the same into the storage 11 in advance.

Figure 2:
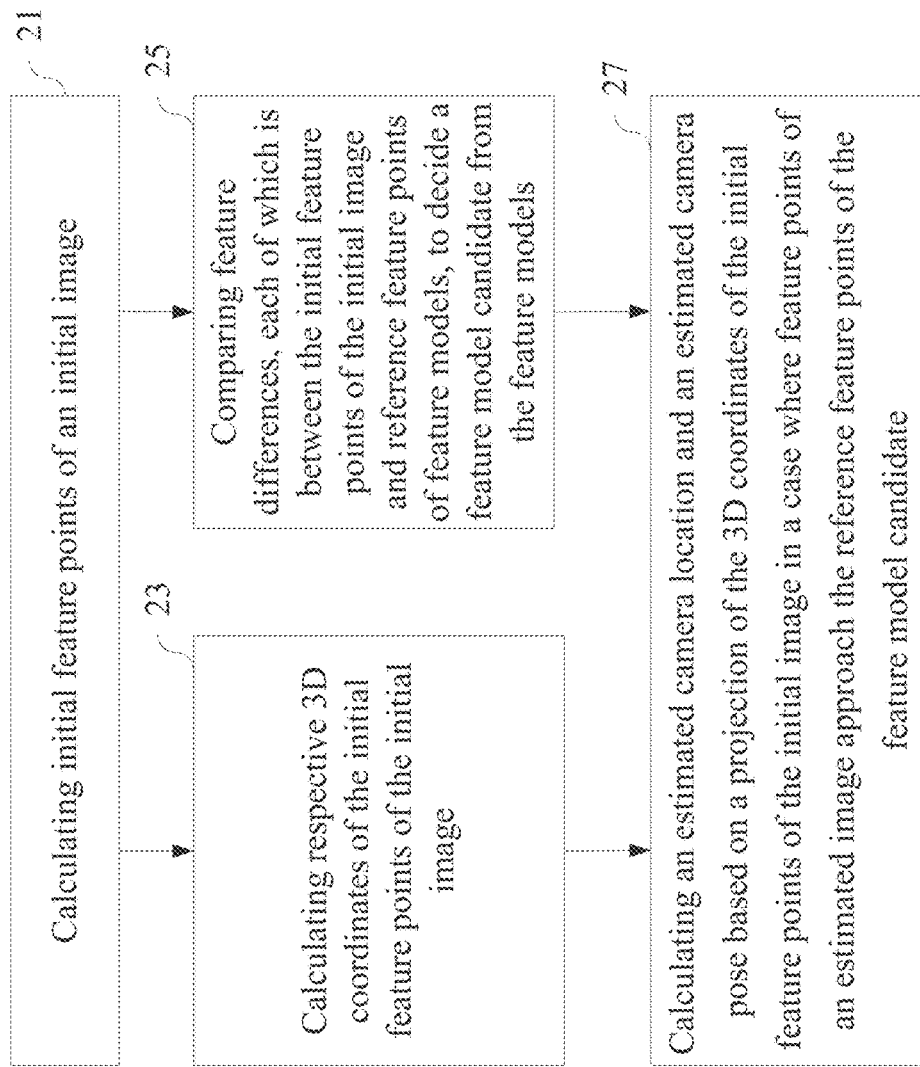
FIG. 2 is a flowchart diagram illustrating how the computer device calculates an estimated camera location and an estimated camera pose according to one or more embodiments of the invention.

FIG. 2 is a flowchart diagram illustrating how the computer device 1 calculates an estimated camera location and an estimated camera pose of a camera according to one or more embodiments of the invention. However, those shown in FIG. 2 are only disclosed as an exemplary example, but not to limit the invention.

Referring to FIG. 2, the processor 13 may be configured to calculate a plurality of initial feature points of an initial image (labeled as process 21). The initial image corresponds to an initial camera location and an initial camera pose; in other words, the initial image is an image produced by a camera which is located at the initial camera location with the initial camera pose.

The processor 13 may also be configured to calculate a plurality of respective three-dimensional coordinates of the initial feature points (labeled as process 23), and to compare a plurality of feature differences, each of which is between the initial feature points of the initial image and the reference feature points of the respective feature models, to decide a feature model candidate from the feature models (labeled as process 25). In some embodiments, the decided feature model candidate corresponds to a minimum of the feature differences.

The processor 13 may further be configured to calculate an estimated camera location and an estimated camera pose based on a projection of the three-dimensional coordinates of the initial feature points of the initial image in a case where a plurality of feature points of an estimated image approach the reference feature points of the feature model candidate (labeled as process 27), wherein the estimated image is produced based on the estimated camera location and the estimated camera pose.

Figure 3A:
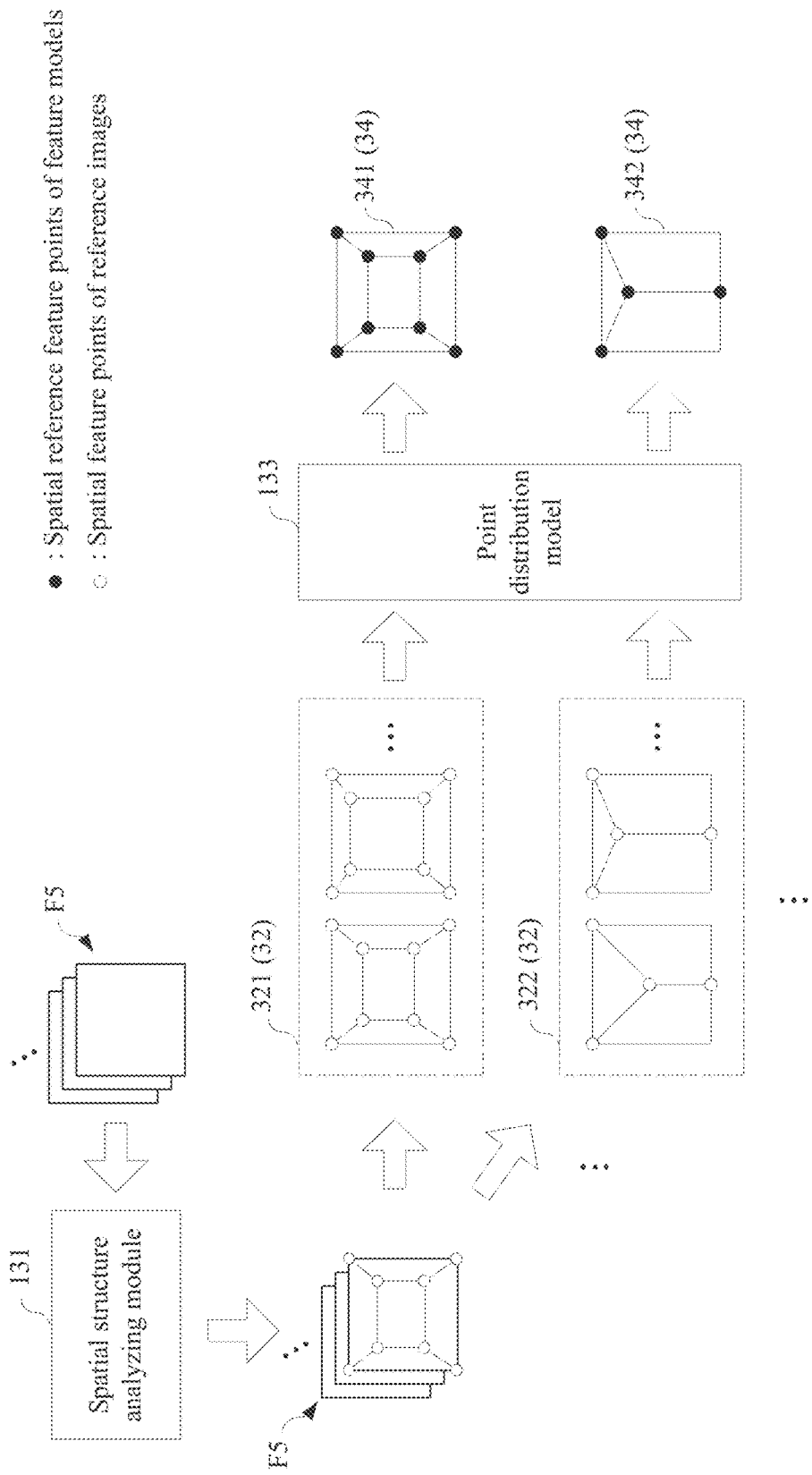
FIG. 3A is a schematic view illustrating how the computer device decides feature models of spatial structures according to one or more embodiments of the invention.
Figure 3B:
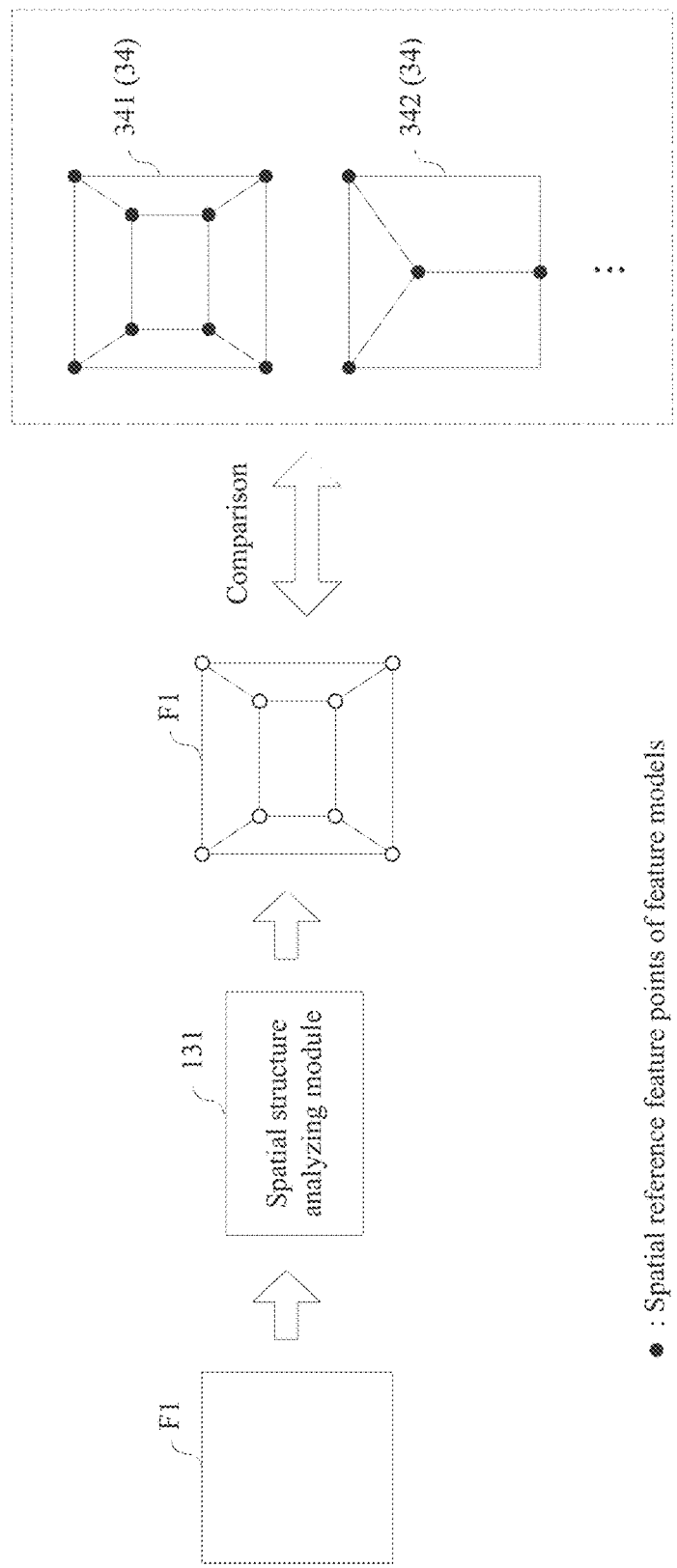
FIG. 3B is a schematic view illustrating how the computer device compares an initial image with the feature models shown in FIG. 3A according to one or more embodiments of the invention.

In some embodiments, the computer device 1 may compare feature differences of spatial structures (or layouts) between the initial image and each of the feature models in a case where the reference feature points of the feature models are spatial reference feature points and the initial feature points of the initial image are spatial initial feature points. The details will be further described in view of FIG. 3A and FIG. 3B. FIG. 3A is a schematic view illustrating how the computer device decides feature models of spatial structures according to one or more embodiments of the invention, while FIG. 3B is a schematic view illustrating how the computer device compares an initial image with the feature models shown in FIG. 3A according to one or more embodiments of the invention. However, those shown in FIG. 3A and FIG. 3B are only disclosed as an exemplary example, but not to limit the invention.

Referring to FIG. 3A, the processor 13 may be configured to analyze each of a plurality of reference images F5 with a spatial structure analyzing module 131 to calculate a plurality of spatial feature points of each of the reference images F5. The spatial structure analyzing module 131 may be used to analyze the spatial structure of each of the reference images F5 based on various spatial structure analyzing algorithms In some embodiments, the spatial structure analyzing module 131 may analyze the reference images F5 based on a volumetric reasoning algorithm which was disclosed by David C. Lee, Abhinav Gupta, Martial Hebert and Takeo Kanade in the NIPS 2010's paper of "Estimating Spatial Layout of Rooms using Volumetric Reasoning about Objects and Surfaces." The volumetric reasoning algorithm is only disclosed as an exemplary example, but not to limit the invention. For example, the processor 13 may use the spatial structure analyzing module 131 to detect and identify edges of walls, ceilings, floors and/or any background objects and decide the spatial feature points of each of the reference images F5 according to the cross-points of the identified edges of the respective reference images F5. For the sake of easily describing FIG. 3A, the hollow circles shown on each of the reference images F5 represent the spatial feature points of a corresponding reference image F5.

After deciding the spatial feature points of all of the reference images F5, the processor 13 may be further configured to divide the reference images F5 into one or more spatial structure groups 32 corresponding to different types of spatial structure according to the spatial feature points of the reference images F5. For example, as shown in FIG. 3A, the reference images F5 with eight spatial feature points may be grouped into a spatial structure group 321, and those with four spatial feature points may be grouped into a spatial structure group 322.

After dividing the reference images F5, the processor 13 may be further configured to optimize the spatial structure groups 32 respectively with a point distribution module 133 to decide one or more spatial feature models 34 with respective spatial reference feature points. The point distribution module 133 is a model for representing the mean geometry of a shape and some statistical modes of geometric variation inferred from a training set of shapes. By the point distribution module 133, the processor 13 may decide the optimal representatives from the spatial structure groups 32 to be the spatial feature models 34 respectively. For example, as shown in FIG. 3A, a spatial feature model 341 may be the optimal representative of the spatial structure group 321, and a spatial feature model 342 may be the optimal representative of the spatial structure group 322. For the sake of easily describing FIG. 3A, the solid circles shown on each of the spatial feature models 34 represent the spatial reference feature points of a corresponding spatial feature model 34.

Referring to FIG. 3B, the processor 13 may also be configured to analyze an initial image F1 with the spatial structure analyzing module 131 to calculate spatial initial feature points of the initial image F1. For the sake of easily describing FIG. 3B, the hollow circles shown on the initial image F1 represent spatial initial feature points of the initial image F1 and the solid circles shown on each of the spatial feature models 34 represent the spatial reference feature points of a corresponding spatial feature model 34.

After calculating the spatial initial feature points of the initial image F1 and the spatial reference feature points of the spatial feature models 34, the processor 13 may further be configured to calculate spatial feature point differences between the initial image F1 and the respective spatial feature models 34 and then compare the spatial feature point differences to decide a spatial feature model candidate from the spatial feature models 34 with a minimum of the feature differences. For example, as shown in FIG. 3B, the processor 13 may decide the spatial feature model 341 to be the spatial feature model candidate because the spatial feature point difference between the initial image F1 and the spatial feature model 341 is smaller than those between the initial image F1 and the other spatial feature models 34.

Figure 4A:
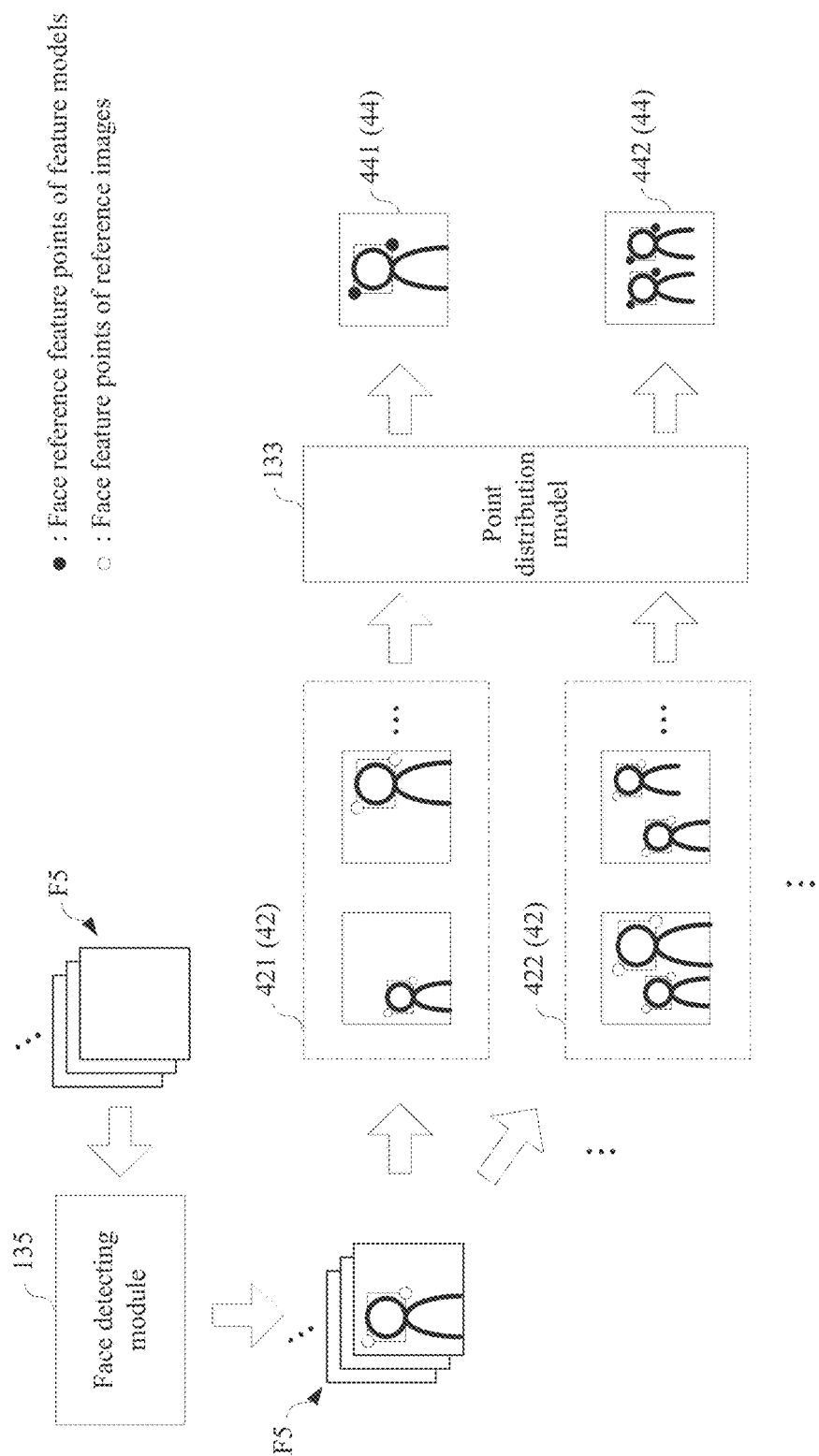
FIG. 4A is a schematic view illustrating how the computer device decides feature models of faces according to one or more embodiments of the invention.
Figure 4B:
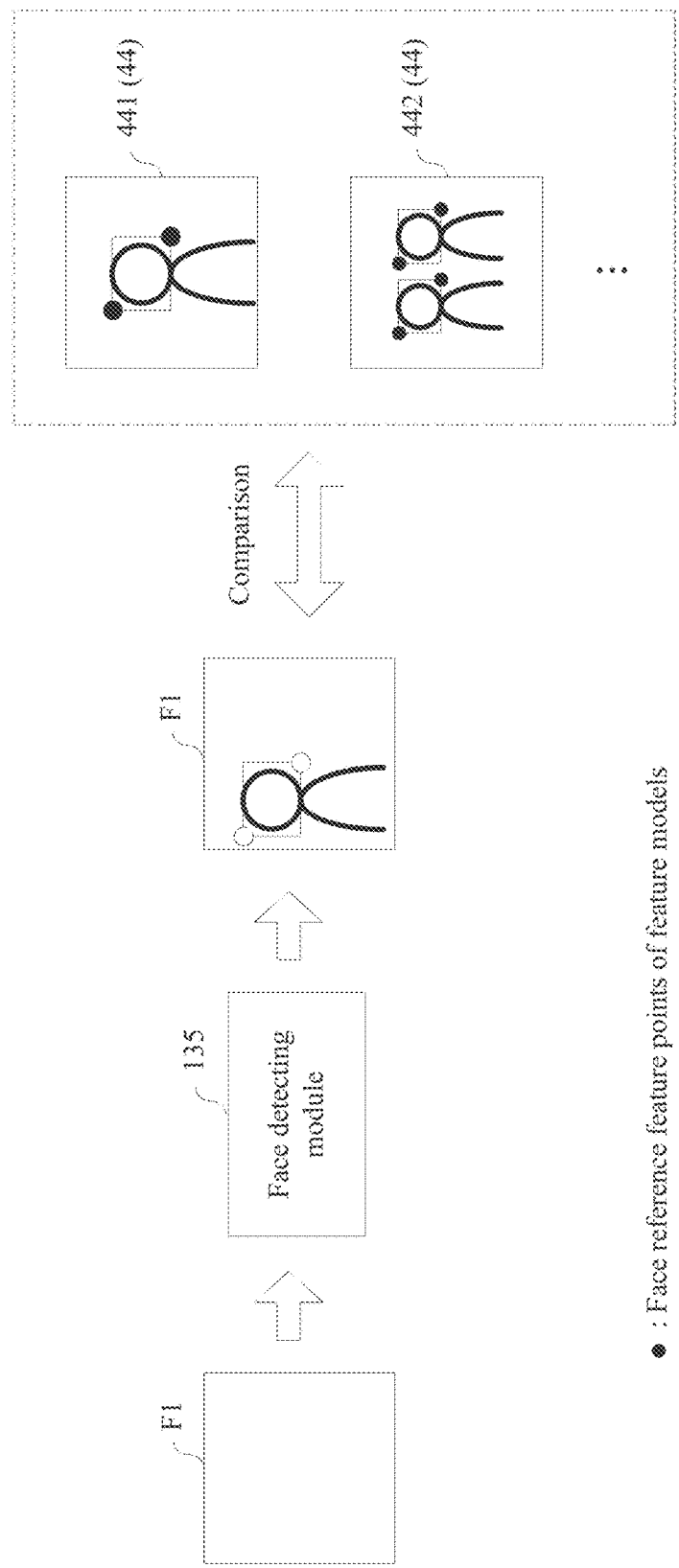
FIG. 4B is a schematic view illustrating how the computer device compares an initial image with the feature models shown in FIG. 4A according to one or more embodiments of the invention.

In some embodiments, the computer device 1 may compare feature differences of face between the initial image and each of the feature models in a case where the reference feature points of the feature models are face reference feature points and the initial feature points of the initial image are face initial feature points. The details will be further described in view of FIG. 4A and FIG. 4B. FIG. 4A is a schematic view illustrating how the computer device decides feature models of faces according to one or more embodiments of the invention. FIG. 4B is a schematic view illustrating how the computer device compares an initial image with the feature models shown in FIG. 4A according to one or more embodiments of the invention. However, those shown in FIG. 4A and FIG. 4B are only disclosed as an exemplary example, but not to limit the invention.

Referring to FIG. 4A, the processor 13 may be configured to analyze each of a plurality of reference images F5 with a face detecting module 135 to calculate a plurality of face feature points of each of the reference images F5. The face detecting module 135 may be used to analyze the face(s) appearing in each of the reference images F5 based on various face detecting algorithms In some embodiments, the face detecting module 135 may analyze the reference images F5 based on a shape-based human detection algorithm which was disclosed by Lin Z and Davis LS in the IEEE TPAMI 2010's paper of "Shape-based human detection and segmentation via hierarchical part-template matching." The shape-based human detection algorithm is only disclosed as an exemplary example, but not to limit the invention. For example, the processor 13 may use the face detecting module 135 to detect and identify face(s) of each of the reference images F5 and then define each face with a pair of diagonal face feature points in each of the reference images F5. For the sake of easily describing FIG. 4A, the hollow circles shown on each of the reference images F5 represent the face feature points of a corresponding reference image F5.

After deciding the face feature points of all of the reference images F5, the processor 13 may be further configured to divide the reference images F5 into one or more face groups 42 corresponding to different quantity of faces according to the face points of the reference images F5. For example, as shown in FIG. 4A, the reference images F5 with only one face denoted by two face feature points may be grouped into a face group 421, and those with two faces denoted by four face feature points may be grouped into a face group 422.

After dividing the reference images F5, the processor 13 may be further configured to optimize the face groups 42 respectively with the point distribution module 133 to decide one or more face feature models 44 with respective face reference feature points. By the point distribution module 133, the processor 13 may decide the optimal representatives from the face groups 42 to be the face feature models 44 respectively. For example, as shown in FIG. 4A, a face feature model 441 may be the optimal representative of the face group 421, and a face feature model 442 may be the optimal representative of the face group 422. For the sake of easily describing FIG. 4A, the solid circles shown on each of the face feature models 44 represent the face reference feature points of a corresponding face feature model 44.

Referring to FIG. 4B, the processor 13 may also be configured to analyze the initial image F1 with the face detecting module 135 to calculate face initial feature points of the initial image F1. For the sake of easily describing FIG. 4B, the hollow circles shown on the initial image F1 represent face initial feature points of the initial image F1 and the solid circles shown on each of the face feature models 44 represent the face reference feature points of a corresponding face feature model 44.

After calculating the face initial feature points of the initial image F1 and the face reference feature points of the face feature models 44, the processor 13 may further be configured to calculate face feature point differences between the initial image F1 and the respective face feature models 44 and then compare the face feature point differences to decide a face feature model candidate from the face feature models 44 with a minimum of the feature differences. For example, as shown in FIG. 4B, the processor 13 may decide the face feature model 441 to be the face feature model candidate because the face feature point difference between the initial image F1 and the face feature model 441 is smaller than those between the initial image F1 and the other face feature models 44.

In some embodiments, the computer device 1 may compare feature differences of spatial structures (or layouts) between the initial image F1 and each of the spatial feature models 34 to decide a spatial feature model candidate from the spatial feature models 34 and compare feature differences of faces between the initial image F1 and each of the face feature models 44 to decide a face feature model candidate from the face feature models 44, together.

Figure 5:
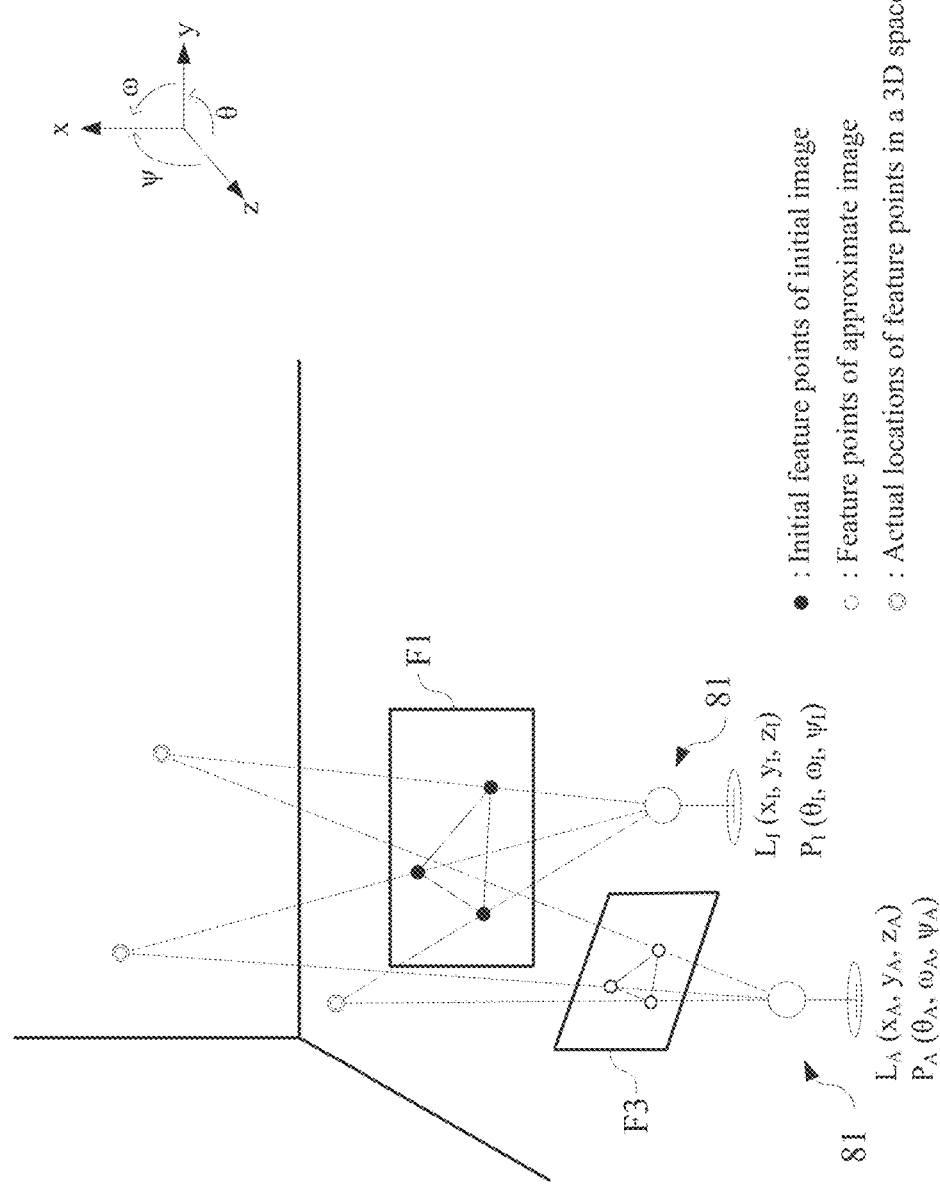
FIG. 5 is a schematic view illustrating how the computer device calculates respective three-dimensional coordinates of initial feature points of an initial image according to one or more embodiments of the invention.

FIG. 5 is a schematic view illustrating how the computer device 1 calculates respective three-dimensional (3D) coordinates of the initial feature points (spatial initial feature points and/or face initial feature points) of the initial image F1 according to one or more embodiments of the invention. However, those shown in FIG. 5 are only disclosed as an exemplary example, but not to limit the invention.

Referring to FIG. 5, if a camera 81 have taken the initial image F1 at an initial camera location $L_I$ $(x_I, y_I, z_I)$ with an initial camera pose $P_I$ $(\theta_I, \omega_I, \psi_I)$ and taken at least one approximate image F3 at an approximate camera location $L_A$ $(x_A, y_A, z_A)$ with an approximate camera pose $P_A$ $(\theta_A, \omega_A,$ $\psi_A$) in a 3D space, then the processor 13 of the computer device 1 may calculate the respective 3D coordinates of the initial feature points of the initial image F1 to identify actual locations of the initial feature points in the 3D space, based on a correspondence relationship between the initial feature points of the initial image F1 and the feature points of the approximate image F3.

The elements of $x_I$, $y_I$ and $z_I$ represent the 3D coordinate of the camera 81 at the initial camera location $L_I$, while the elements of $x_A$, $y_A$ and $z_A$ represent the 3D coordinate of the camera 81 at the approximate camera location $L_A$. In respect of the initial camera pose $P_I$ and the approximate camera pose $P_A$, the elements of $\theta_I$ and $\theta_A$ represent the respective rotation angles within the y-z plane, the elements of $\omega_I$ and $\omega_I$ represent the respective rotation angles within the x-y plane, and the elements of $\psi_I$ and $\psi_A$ represent the respective rotation angles within the x-z plane.

For the sake of easily describing FIG. 5, the solid circles shown on the initial image F1 represent the initial feature points of the initial image F1, the hollow circles shown on the approximate image F3 represent the feature points of the approximate image F3, and the symbols of double-circles represent the actual locations of the initial feature points in the 3D space. As shown in FIG. 5, each line through an initial feature point of the initial image F1 may meet another line through a corresponding feature point of the approximate image F3 at a specific 3D coordination point in the 3D space. Each of the meeting points (i.e., the specific 3D coordination points) represent the actual location of one initial feature point of the initial image F1 in the 3D space. Therefore, by calculating such meeting points, the processor 13 of the computer device 1 is able to identify actual locations of the initial feature points in the 3D space.

In some embodiments, the camera 81 may take the initial image F1 after taking the approximate image F3. In some embodiments, the camera 81 may take the initial image F1 before taking the approximate image F3.

In some embodiment, the approximate camera location $L_A$ ($x_A$, $y_A$, $z_A$) may be the same as the initial camera location $L_I$ ($x_I$, $y_I$, $z_I$) but the approximate camera pose $P_A$ ($\theta_A$, $\omega_A$, $\psi_A$) may be different slightly from the initial camera pose $P_I$ ($\theta_I$, $\omega_I$, $\psi_I$). In some embodiment, the approximate camera pose $P_A$ ($\theta_A$, $\omega_A$, $\psi_A$) may be the same as the initial camera pose $P_I$ ($\theta_I$, $\omega_I$, $\psi_I$) but the approximate camera location $L_A$ ($x_A$, $y_A$, $z_A$) may be different slightly from the initial camera location $L_I$ ($x_I$, $y_I$, $z_I$). In some embodiment, the approximate camera location $L_A$ ($x_A$, $y_A$, $z_A$) may be different slightly from the initial camera location $L_I$ ($x_I$, $y_I$, $z_I$) and the approximate camera pose $P_A$ ($\theta_A$, $\omega_A$, $\psi_A$) may be different slightly from the initial camera pose $P_I$ ($\theta_I$, $\omega_I$, $\psi_1$).

In some embodiments, the processor 13 of the computer device 1 may calculate the respective 3D coordinates of the initial feature points of the initial image F1 without using the information of the approximate image F3, in a case where the camera 81 includes a depth sensor used to detect the depths of the initial feature points of the initial image F1.

Figure 6:
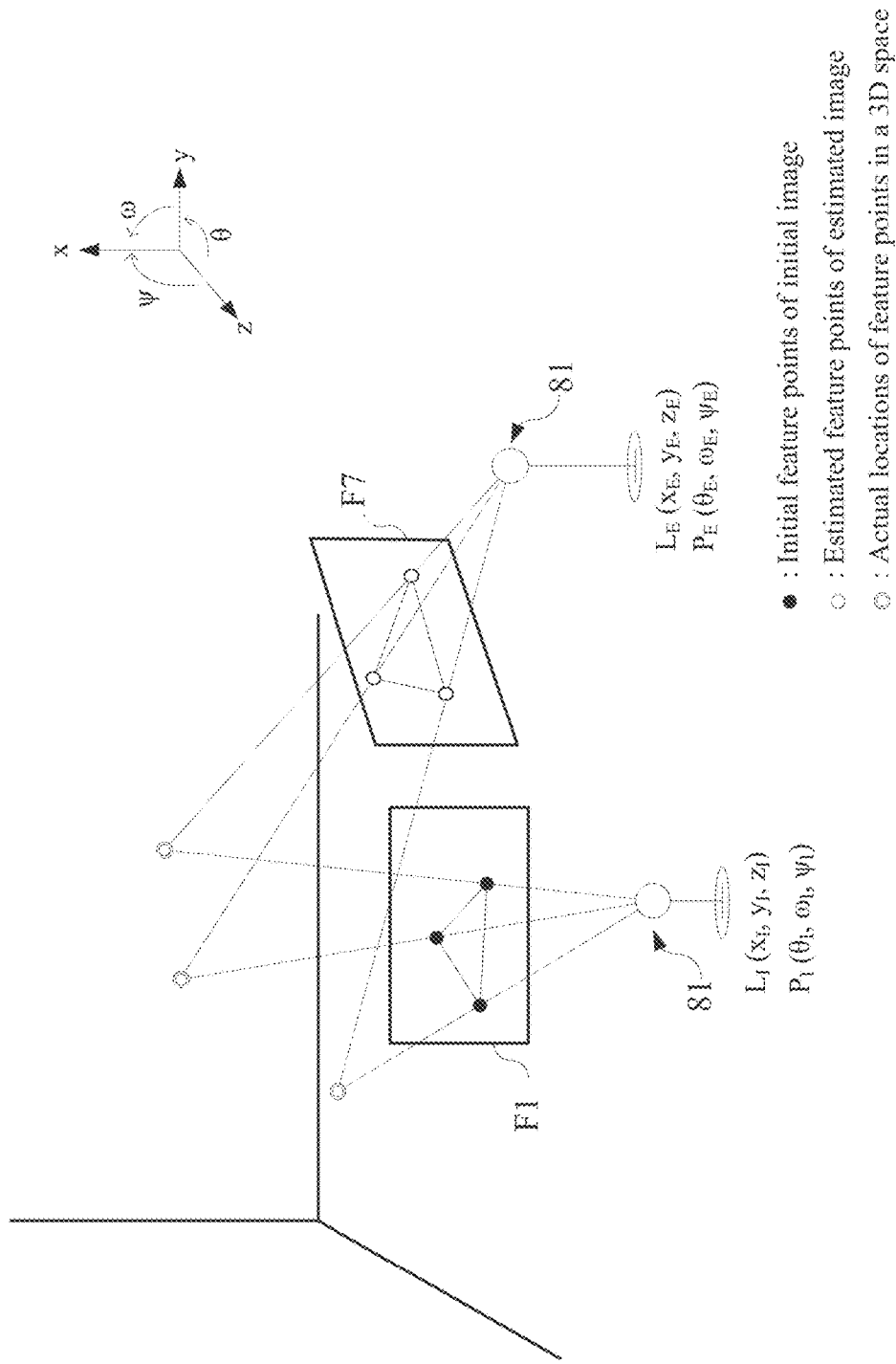
FIG. 6 is a schematic view illustrating how the computer device calculates the estimated camera location and the estimated camera pose based on a projection of the three-dimensional coordinates of the initial feature points of the initial image according to one or more embodiments of the invention.

FIG. 6 is a schematic view illustrating how the computer device 1 calculates an estimated camera location and an estimated camera pose of the camera 81 based on a projection of the 3D coordinates of the initial feature points of the initial image F1 according to one or more embodiments of the invention. However, those shown in FIG. 6 are only disclosed as an exemplary example, but not to limit the invention.

Referring to FIG. 6, after calculating the respective 3D coordinates of the initial feature points of the initial image F1, the processor 13 of the computer device 1 may calculate an estimated camera location $L_E$ ($x_E$, $y_E$, $z_E$) and an estimated camera pose $P_E$ ($\theta_E$, $\omega_E$, $\psi_E$) of the camera 81 based on a projection of the 3D coordinates of the initial feature points of the initial image F1 in a case where feature points of an estimated image F7 approach the reference feature points (including the spatial feature points and/or the face feature points) of the feature model candidate (including the spatial feature model candidate and/or the face feature model candidate), wherein the estimated image F7 is produced based on the estimated camera location $L_E$ ($x_E$, $y_E$, $z_E$) and the estimated camera pose $P_E$ ($\theta_E$, $\omega_E$, $\psi_E$). The elements of $x_E$, $y_E$ and $z_E$ represent the 3D coordinate of the camera 81 at the estimated image F7. In respect of the estimated camera pose $P_E$, the element of $\theta_E$ represents the rotation angle within the y-z plane, the element of $\omega_E$ represents the rotation angle within the x-y plane, and the element of $\psi_E$ represents the rotation angle within the x-z plane. For the sake of easily describing FIG. 6, the solid circles shown on the initial image F1 represent the initial feature points of the initial image F1, the hollow circles shown on the estimated image F7 represent the feature points of the estimated image F7, and the symbols of double-circles represent the actual locations of the initial feature points (i.e., the 3D coordinates of the initial feature points) in the 3D space. As shown in FIG. 6, for example, the processor 13 of the computer device 1 may regard a camera location and a camera pose of the camera 81 in the 3D as the estimated camera location $L_E$ ($x_E$, $y_E$, $z_E$) and the estimated camera pose $P_E$ ($\theta_E$, $\omega_E$, $\psi_E$) respectively as the projection of the 3D coordinates of the initial feature points of the initial image F1 onto an image which is taken at the camera location with the camera pose satisfies that the feature difference between the image and the feature model candidate is smaller than a predetermined threshold.

In some embodiments, the processor 13 of the computer device 1 may calculate the estimated camera location $L_E$ ($x_E$, $y_E$, $z_E$) and the estimated camera pose $P_E$ ($\theta_E$, $\omega_E$, $\psi_E$) of the camera 81 based on various matching and optimization algorithms. For example, the processor 13 of the computer device 1 may calculate the estimated camera location $L_E$ ($x_E$, $y_E$, $z_E$) and the estimated camera pose $P_E$ ($\theta_E$, $\omega_E$, $\psi_E$) of the camera 81 based on a re-photograph algorithm which was disclosed by Soonmin Bae, Aseem Agarwala and Fredo Durand in ACM Transactions on Graphics 2010's paper of "Computational Re-Photography." The re-photograph algorithm is only disclosed as an exemplary example, but not to limit the invention.

In some embodiments, the processor 13 of the computer device 1 may calculate a statistical foreground distribution proportion of the reference images F5 by itself and then store the same into the storage 11 of the computer device 1 in advance. Also, after calculating the estimated camera location $L_E$ ($x_E$, $y_E$, $z_E$) and the estimated camera pose $P_E$ ($\theta_E$, $\omega_E$, $\psi_E$) of the camera 81, the processor 13 of the computer device 1 may be further configured to calculate an estimated foreground distribution proportion of the estimated image F7, and compare a difference between the estimated foreground distribution proportion and the statistical foreground distribution proportion to decide an estimated field of view of the estimated image F7.

Figure 7:
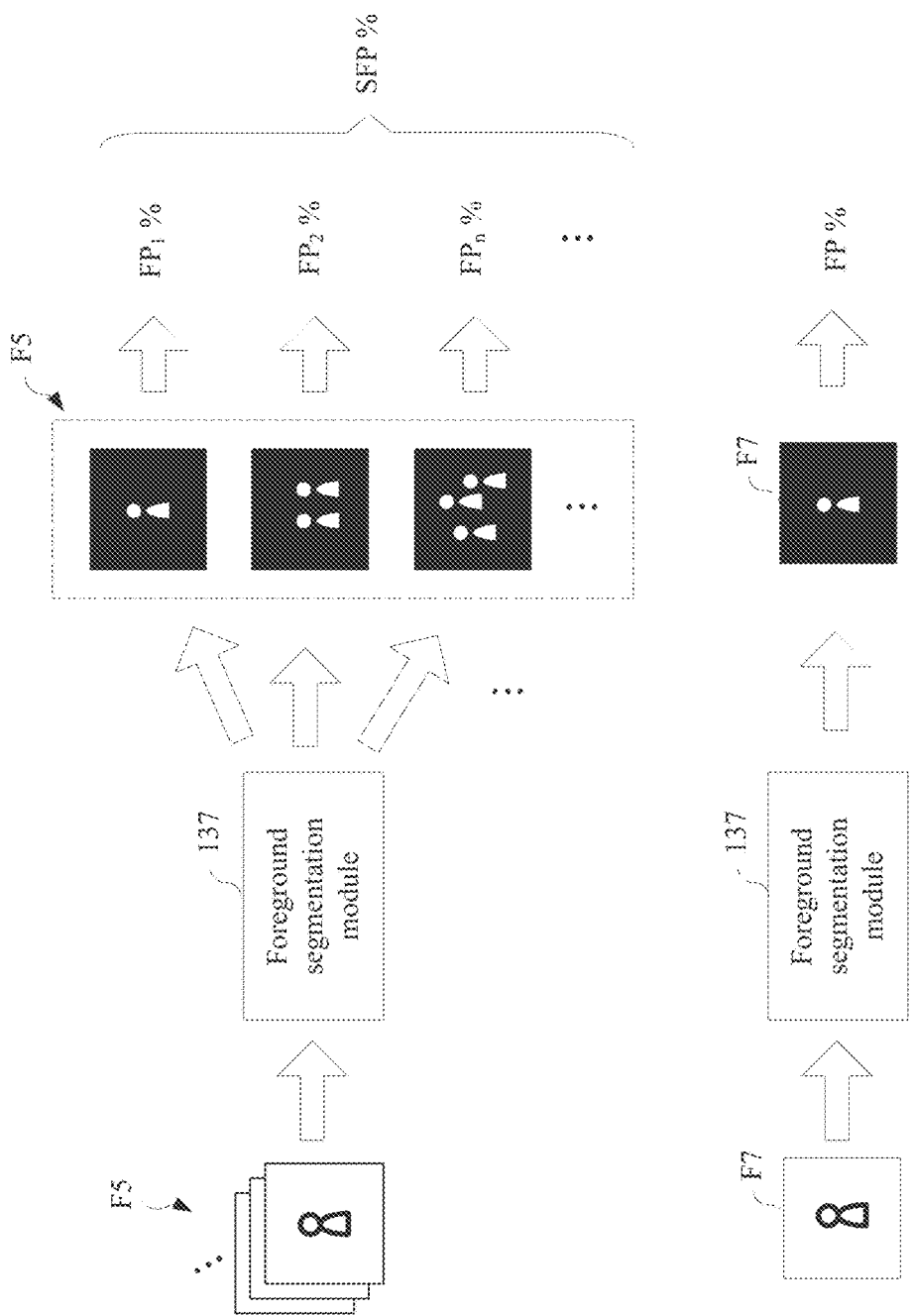
FIG. 7 is a schematic view illustrating how the computer device calculates a statistical foreground distribution proportion of reference images and an estimated foreground distribution proportion of an estimated image.

FIG. 7 is a schematic view illustrating how the computer device 1 calculates the statistical foreground distribution proportion of the reference images F5 and the estimated foreground distribution proportion of the estimated image F7. However, those shown in FIG. 7 are only disclosed as an exemplary example, but not to limit the invention.

Referring to FIG. 7, the processor 13 of the computer device 1 may configured to analyze each of the reference images F5 with a foreground segmentation module 137 to calculate a foreground distribution proportion of each of the reference images F5. The foreground segmentation module 137 may be used to calculate the foreground distribution proportion of each of the reference images F5 based on various foreground segmentation algorithms In some embodiments, the foreground segmentation module 137 may calculate the foreground distribution proportion of each of the reference images F5 based on a shape-based human segmentation algorithm which was disclosed by Lin Z and Davis LS in the IEEE TPAMI 2010's paper of "Shape-based human detection and segmentation via hierarchical part-template matching." The shape-based human segmentation algorithm is only disclosed as an exemplary example, but not to limit the invention.

After calculating the foreground distribution proportion of each of the reference images F5, the processor 13 of the computer device 1 may be further configured to calculate the statistical foreground distribution proportion based on all of the foreground distribution proportion of the reference images F5. The statistical foreground distribution proportion is a statistical value that indexes a family of probability distributions in respect of all of the foreground distribution proportion of the reference images F5. For example, the family of normal distributions has two parameters, the mean value and the variance.

The processor 13 of the computer device 1 may also be configured to analyze the estimated image F7 with the foreground segmentation module 137 to calculate the estimated foreground distribution proportion of the estimated image F7.

For the sake of easily describing FIG. 7, the foreground distribution proportion of the reference image F5 are expressed as $FP_1\%$, $FP_2\%$, ..., and $FP_n\%$, the statistical foreground distribution proportion is expressed as SFP %, and the estimated foreground distribution proportion of the estimated image F7 is expressed as FP %. The subscript n is the number of the reference image F5. The processor 13 of the computer device 1 may compare a difference between the estimated foreground distribution proportion FP % and the statistical foreground distribution proportion SFP % to decide an estimated field of view of the estimated image F7 for the camera 81. For example, if the estimated foreground distribution proportion FP % is larger than the statistical foreground distribution proportion SFP %, the processor 13 may decide that a wider field of view is necessary for the estimated image F7 (i.e., the camera 81 may need to zoom out the estimated image F7). On the contrary, the processor 13 may decide that a narrower field of view is necessary for the estimated image F7 (i.e., the camera 81 may need to zoom in the estimated image F7).

In some embodiments, a user may also control the processor 13 via the optional I/O interface 15 or the optional network interface 17 to store a predetermined foreground distribution proportion from the outside into the storage 11 in advance. In addition, the processor 13 may compare a difference between the estimated foreground distribution proportion of the estimated image F7 and the predetermined foreground distribution proportion to decide an estimated field of view of the estimated image F7.

In some embodiments, the processor 13 may also automatically search a specific foreground distribution proportion on the network 19 via the optional network interface 17 and then store the same into the storage 11 in advance. In addition, the processor 13 may compare a difference between the estimated foreground distribution proportion of the estimated image F7 and the specific foreground distribution proportion to decide an estimated field of view of the estimated image F7.

Figure 8:
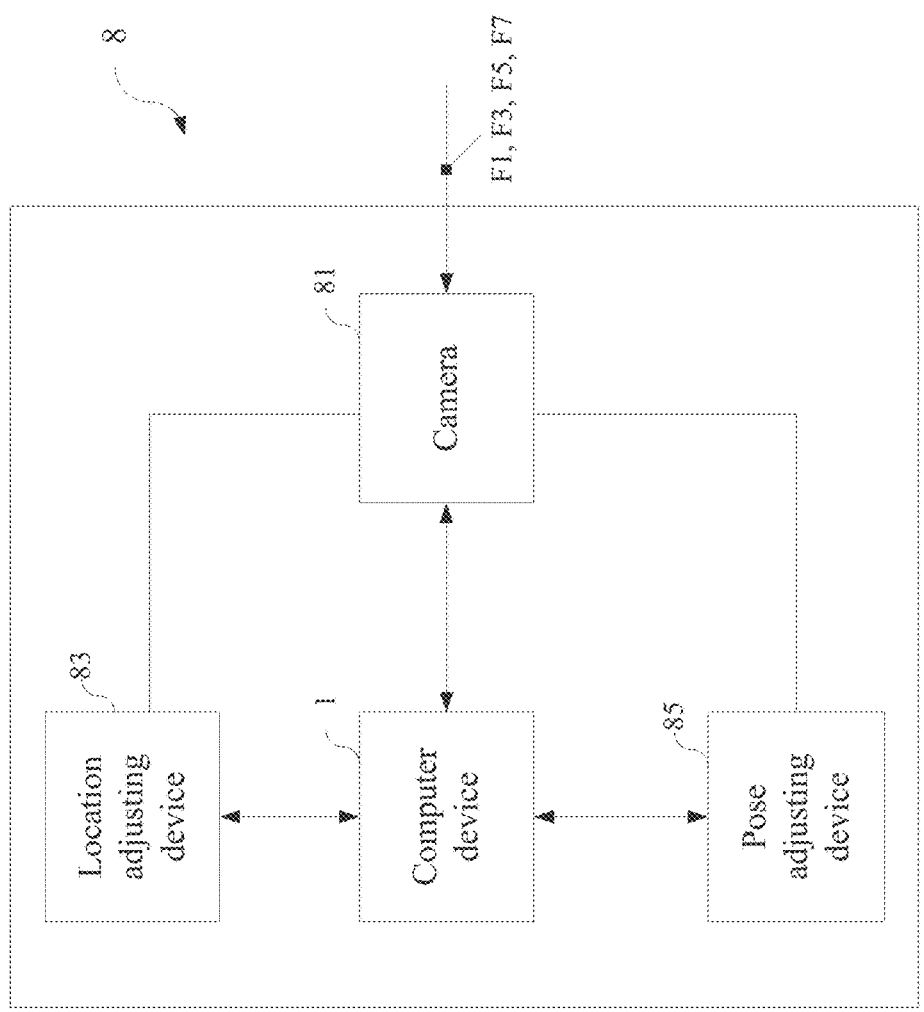
FIG. 8 illustrates an architecture of a camera system according to one or more embodiments of the invention.

FIG. 8 illustrates an architecture of a camera system 8 according to one or more embodiments of the invention. However, the camera system illustrated in FIG. 8 is only provided as an exemplary example, but not to limit the invention. Referring to FIG. 8, a camera system 8 may comprise the computer device 1 and the camera 81 as above-described, and may further comprise a location adjusting device 83, and a pose adjusting device 85. The computer device 1, the camera 81, the location adjusting device 83, and the pose adjusting device 85 may be electrically connected with each other in a wired way or wireless way. The computer device 1 may be used to control the camera 81, the location adjusting device 83, and the pose adjusting device 85 through the wired or wireless connection.

According to the instructions of the computer device 1, the camera 81 may be configured to provide the initial image F1 based on the initial camera location $L_I (x_I, y_I, z_I)$ and the initial camera pose $P_I (\theta_I, \omega_I, \psi_I)$, provide the approximated image F3 based on the approximated camera location $L_A (x_A, y_A, z_A)$ and the approximated camera pose $P_A (\theta_A, \omega_A, \psi_A)$, and provide the estimated image F7 based on the estimated camera location $L_E (x_E, y_E, z_E)$ and the estimated camera pose $P_E (\theta_E, \omega_E, \psi_E)$, respectively. In some embodiments, the camera 81 may also be configured to provide the reference images F5.

In some embodiments, as the camera 81 has been located at the estimated camera location $L_E (x_E, y_E, z_E)$ with the estimated camera pose $P_E (\theta_E, \omega_E, \psi_E)$, the camera 81 may be further configured to zoom in or zoom out the current field of view based on the estimated field of view of the estimated image F7 which has also been calculated by the computer device 1. In other words, the camera 81 may provide the estimated image F7 based on the estimated field of view of the estimated image F7 in addition to the estimated camera location $L_E (x_E, y_E, z_E)$ and the estimated camera pose $P_E (\theta_E, \omega_E, \psi_E)$.

The location adjusting device 83 may be operably connected to the camera 81. According to the instructions of the computer device 1, the location adjusting device 83 may be configured to adjust the camera 81 to the initial camera location $L_I (x_I, y_I, z_I)$ and the estimated camera location $L_E (x_E, y_E, z_E)$ respectively. For example, the location adjusting device 83 may comprise various vehicles including a moving unit (e.g., wheels) and a driving unit (e.g. an engine) to enable the camera 81 to move to the initial camera location $L_I (x_I, y_I, z_I)$ and the estimated camera location $L_E (x_E, y_E, z_E)$ respectively.

The pose adjusting device 85 may be operably connected to the camera 81. According to the instructions of the computer device 1, the pose adjusting device 85 may be configured to adjust the camera 81 to the initial camera pose $P_I (\theta_I, \omega_I, \psi_I)$ and the estimated camera pose $P_E (\theta_E, \omega_E, \psi_E)$ respectively. For example, the pose adjusting device 85 may comprise various adjustors including an rotating unit (e.g., a sphere rotor) and a driving unit (e.g. an engine) to enable the camera 81 to be adjusted to the initial camera pose $P_I (\theta_I, \omega_I, \psi_I)$ and the estimated camera pose $P_E (\theta_E, \omega_E, \psi_E)$ respectively.

The camera system 8 may accomplish all the outcomes which the computer device 1 does as mentioned above. Since people skilled in the art can easily appreciate how the camera system 8 accomplish the outcomes based on the aforesaid description of the computer device 1, the relevant content will not be further described again.

Figure 9:
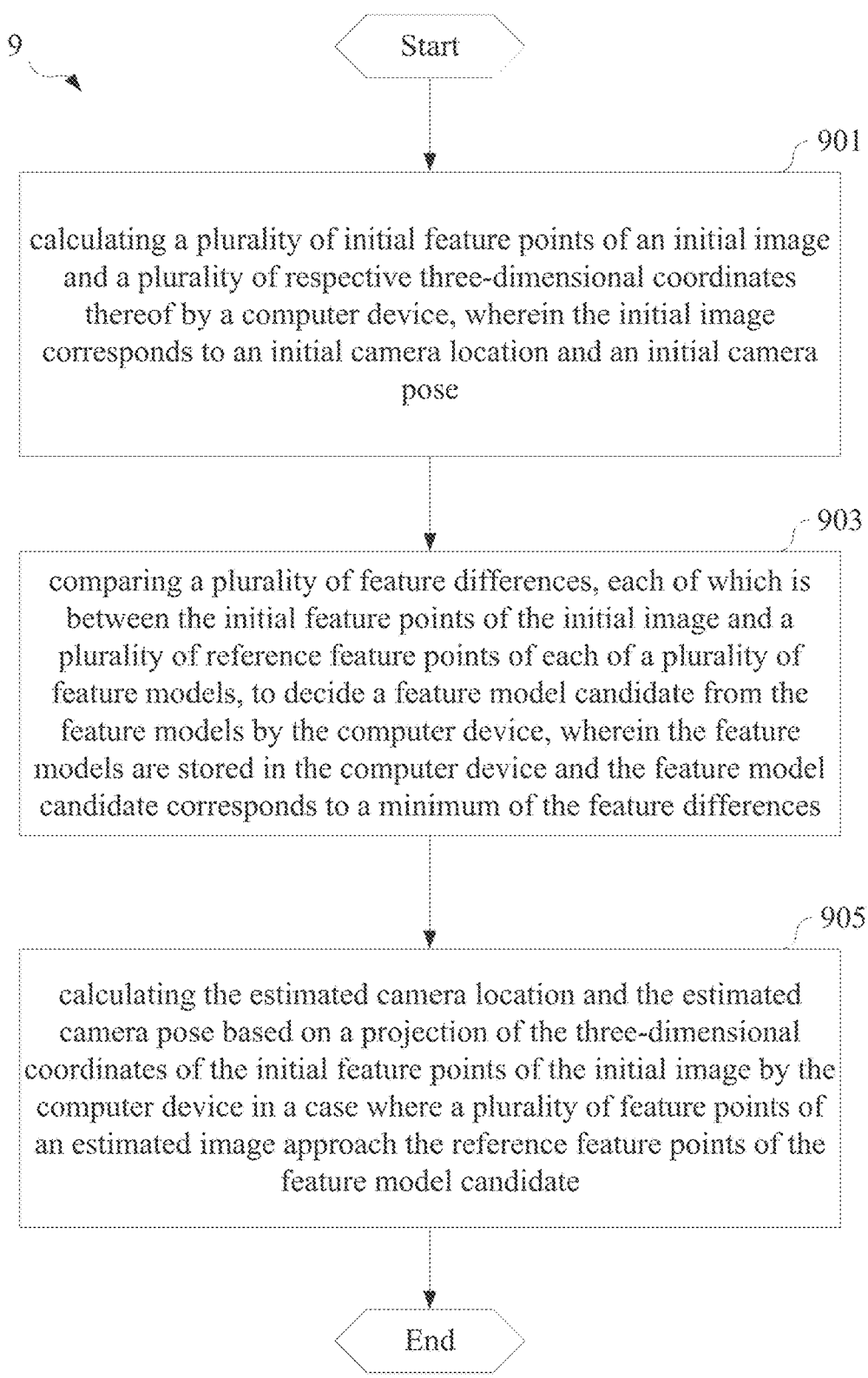
FIG. 9 illustrates a flowchart diagram of a calculation method for calculating an estimated camera location and an estimated camera pose according to one or more embodiments of the invention.

FIG. 9 illustrates a flowchart diagram of a calculation method 9 for calculating an estimated camera location and an estimated camera pose according to one or more embodiments of the invention. However, those shown in FIG. 9 are only disclosed as an exemplary example, but not to limit the invention.

Referring to FIG. 9, a calculation method 9 for calculating an estimated camera location and an estimated camera pose may comprise: calculating a plurality of initial feature points of an initial image and a plurality of respective 3D coordinates thereof by a computer device (labeled as step 901), wherein the initial image corresponds to an initial camera location and an initial camera pose; comparing a plurality of feature differences, each of which is between the initial feature points of the initial image and a plurality of reference feature points of each of a plurality of feature models, to decide a feature model candidate from the feature models by the computer device (labeled as step 903), wherein the feature models are stored in the computer device and the feature model candidate corresponds to a minimum of the feature differences; and calculating the estimated camera location and the estimated camera pose based on a projection of the 3D coordinates of the initial feature points of the initial image by the computer device in a case where a plurality of feature points of an estimated image approach the reference feature points of the feature model candidate (labeled as step 905), wherein the estimated image is produced based on the estimated camera location and the estimated camera pose.

In some embodiments, the reference feature points of the feature models may be spatial reference feature points and the initial feature points of the initial image may be spatial initial feature points.

In some embodiments, the reference feature points of the feature models may be spatial reference feature points and the initial feature points of the initial image may be spatial initial feature points. Also, the calculation method 9 may further comprise: analyzing each of the reference images by the computer device with a spatial structure analyzing module to calculate a plurality of spatial feature points of each of the reference images and divide the reference images into a plurality of spatial structure groups corresponding to different types of spatial structure according to the spatial feature points of the reference images; optimizing the spatial structure groups respectively by the computer device with a point distribution model to decide the feature models with the respective spatial reference feature points; and analyzing the initial image by the computer device with the spatial structure analyzing module to calculate the spatial initial feature points.

In some embodiments, the reference feature points of the feature models may be face reference feature points and the initial feature points of the initial image may be face initial feature points.

In some embodiments, the reference feature points of the feature models may be face reference feature points and the initial feature points of the initial image may be face initial feature points. Also, the calculation method 9 may further comprise: analyzing each of the reference images by the computer device with a face detecting module to calculate a plurality of face feature points of each of the reference images and divide the reference images into a plurality of face groups corresponding to different quantity of faces according to the face feature points of the reference images; optimizing the face groups respectively by the computer device with a point distribution model to decide the feature models with the respective face reference feature points; and analyzing the initial image by the computer device with the face detecting module to calculate the face initial feature points.

In some embodiments, the calculation method 9 may further comprise: calculating an estimated foreground distribution proportion of the estimated image by the computer device; and comparing by the computer device a difference between the estimated foreground distribution proportion and a statistical foreground distribution proportion stored in the computer device to decide an estimated field of view of the estimated image.

In some embodiments, the calculation method 9 may further comprise: calculating an estimated foreground distribution proportion of the estimated image by the computer device; and comparing by the computer device a difference between the estimated foreground distribution proportion and a statistical foreground distribution proportion stored in the computer device to decide an estimated field of view of the estimated image. Also, the calculation method 9 may further comprise: analyzing each of the reference images by the computer device with a foreground segmentation module to calculate a foreground distribution proportion of each of the reference images; calculating the statistical foreground distribution proportion by the computer device based on all of the foreground distribution proportion; and analyzing the estimated image by the computer device with the foreground segmentation module to calculate the estimated foreground distribution proportion of the estimated image.

In some embodiments, the calculation method 9 may further comprise: calculating the three-dimensional coordinates of the reference feature points of the initial image by the computer device based on a correspondence relationship between the initial feature points of the initial image and a plurality of feature points of at least one approximate image. Also, the at least one approximate image corresponds to an approximate camera location and an approximate camera pose, which approximate to the initial camera location and the initial camera pose respectively.

An image-providing method according to one or more embodiments of the invention is also disclosed. The image-providing method may comprise the calculation method 9 and the following steps of: providing the initial image by a camera based on the initial camera location and the initial camera pose and providing the estimated image by the camera based on the estimated camera location and the estimated camera pose, respectively; adjusting the camera to the initial camera location and the estimated camera location respectively by a location adjusting device; and adjusting the camera to the initial camera pose and the estimated camera pose respectively by a pose adjusting device.

In some embodiments, the image-providing method may further comprise: calculating an estimated foreground distribution proportion of the estimated image by the computer device; and comparing by the computer device a difference between the estimated foreground distribution proportion and a statistical foreground distribution proportion stored in the computer device to decide an estimated field of view of the estimated image, wherein the camera provides the estimated image based on the estimated camera location, the estimated camera pose, and the estimated field of view in the step of providing the estimated image.

In some embodiments, the calculation method 9 may be applied to the computer device 1 to accomplish all of the operations of the computer device 1, and the image-providing method may be applied to the camera system 8 to accomplish all of the operations of the camera system 8. Since the corresponding steps for accomplishing the operations by the calculation method 9 and the image-providing method may be directly appreciated by people skilled in the art based on the aforesaid description of the computer device 1 and the camera system 8, the relevant details thereof will not be further described herein.

According to the above disclosure, the estimated camera location calculated by the proposed computer device can indicate where a camera shall be located for capturing images, while the estimated camera pose calculated by the proposed computer device can indicate what pose the camera shall hold for capturing such images. Therefore, the proposed computer device enables the proposed camera system to make a decision by itself as for how to capture images.

The location adjusting device enables the camera to move to the estimated camera location automatically and the pose adjusting device enables the camera to pose as the estimated camera pose automatically. Therefore, the proposed camera system may make a decision by itself as for whether to capture images because the camera is ready for capturing images once it has moved to the estimated camera location and posed as the estimated camera pose.

The estimated camera location and the estimated camera pose are calculated depending on the feature models stored in the proposed computer device, which have been produced based on a plurality of reference images. A user can decide a composition of desired image(s) by assigning related images into the reference images or directly storing related feature model into the proposed computer device. In such a way, the proposed camera system is able to capture the desired image(s) for the user, whether the user is a professional photographer or not.

Consequently, the proposed computer device and camera system, and related calculation method and image-providing method indeed provide a good solution such that a camera is able to make a decision by itself as for whether and/or how to capture images.

The above disclosure is related to the detailed technical contents and inventive features thereof. People skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A computer device for calculating an estimated camera location and an estimated camera pose, comprising:
    a storage, being configured to store a plurality of feature models based on a plurality of reference images, wherein each of the feature models comprises a plurality of reference feature points; and
    a processor, being electrically connected to the storage and configured to:
        calculate a plurality of initial feature points of an initial image and a plurality of respective three-dimensional coordinates thereof, wherein the initial image corresponds to an initial camera location and an initial camera pose;
        compare a plurality of feature differences, each of which is between the initial feature points of the initial image and the plurality of reference feature points of each of the plurality of feature models, to decide a feature model candidate from the plurality of feature models, wherein the feature model candidate corresponds to a minimum of the feature differences; and
        calculate the estimated camera location and the estimated camera pose based on a projection of the three-dimensional coordinates of the initial feature points of the initial image in a case where a plurality of feature points of an estimated image approach the reference feature points of the feature model candidate, wherein the estimated image is produced based on the estimated camera location and the estimated camera pose.

2. The computer device of claim 1, wherein the reference feature points of the plurality of feature models are spatial reference feature points and the initial feature points of the initial image are spatial initial feature points.

3. The computer device of claim 2, wherein the processor is further configured to:
    analyze each of the reference images with a spatial structure analyzing module to calculate a plurality of spatial feature points of each of the reference images and divide the reference images into a plurality of spatial structure groups corresponding to different types of spatial structure according to the spatial feature points of the reference images;
    optimize the spatial structure groups respectively with a point distribution module to decide the feature models with respective spatial reference feature points; and
    analyze the initial image with the spatial structure analyzing module to calculate the spatial initial feature points.

4. The computer device of claim 1, wherein the reference feature points of the plurality of feature models are face reference feature points and the initial feature points of the initial image are face initial feature points.

5. The computer device of claim 4, wherein the processor is further configured to:
    analyze each of the reference images with a face detecting module to calculate a plurality of face feature points of each of the reference images and divide the reference images into a plurality of face groups corresponding to different quantity of faces according to the face feature points of the reference images;
    optimize the face groups respectively with a point distribution module to decide the feature models with respective face reference feature points; and
    analyze the initial image with the face detecting module to calculate the face initial feature points.

6. The computer device of claim 1, wherein:
    the storage is further configured to store a statistical foreground distribution proportion of the reference images; and
    the processor is further configured to calculate an estimated foreground distribution proportion of the estimated image, and compare a difference between the estimated foreground distribution proportion and the statistical foreground distribution proportion to decide an estimated field of view of the estimated image.

7. The computer device of claim 6, wherein the processor is further configured to:
    analyze each of the reference images with a foreground segmentation module to calculate a foreground distribution proportion of each of the reference images;
    calculate the statistical foreground distribution proportion based on all of the foreground distribution proportion; and analyze the estimated image with the foreground segmentation module to calculate the estimated foreground distribution proportion of the estimated image.

8. The computer device of claim 1, wherein the processor calculates the three-dimensional coordinates of the reference feature points of the initial image based on a correspondence relationship between the initial feature points of the initial image and a plurality of feature points of at least one approximate image, and the at least one approximate image corresponds to an approximate camera location and an approximate camera pose, which approximate to the initial camera location and the initial camera pose respectively.

9. A camera system comprising the computer device of claim 1, wherein the camera system further comprises:
   a camera, being electrically connected to the computer device and configured to provide the initial image based on the initial camera location and the initial camera pose, and to provide the estimated image based on the estimated camera location and the estimated camera pose;
   a location adjusting device, being electrically connected to the computer device and operably connected to the camera, and adjusting the camera to the initial camera location and the estimated camera location respectively; and
   a pose adjusting device, being electrically connected to the computer device and operably connected to the camera, and adjusting the camera to the initial camera pose and the estimated camera pose respectively.

10. The camera system of claim 9, wherein:
    the storage of the computer device is further configured to store a statistical foreground distribution proportion of the reference images;
    the processor of the computer device is further configured to calculate an estimated foreground distribution proportion of the estimated image, and compare a difference between the estimated foreground distribution proportion and the statistical foreground distribution proportion to decide an estimated field of view of the estimated image; and
    the camera provides the estimated image based on the estimated camera location, the estimated camera pose, and the estimated field of view.

11. A calculation method for calculating an estimated camera location and an estimated camera pose, comprising:
    calculating a plurality of initial feature points of an initial image and a plurality of respective three-dimensional coordinates thereof by a computer device, wherein the initial image corresponds to an initial camera location and an initial camera pose;
    comparing a plurality of feature differences, each of which is between the initial feature points of the initial image and a plurality of reference feature points of each of a plurality of feature models, to decide a feature model candidate from the plurality of feature models by the computer device, wherein the feature models are stored in the computer device and the feature model candidate corresponds to a minimum of the feature differences; and
    calculating the estimated camera location and the estimated camera pose based on a projection of the three-dimensional coordinates of the initial feature points of the initial image by the computer device in a case where a plurality of feature points of an estimated image approach the reference feature points of the feature model candidate, wherein the estimated image is produced based on the estimated camera location and the estimated camera pose.

12. The calculation method of claim 11, wherein the reference feature points of the plurality of feature models are spatial reference feature points and the initial feature points of the initial image are spatial initial feature points.

13. The calculation method of claim 12, further comprising:
    analyzing each of the reference images by the computer device with a spatial structure analyzing module to calculate a plurality of spatial feature points of each of the reference images and divide the reference images into a plurality of spatial structure groups corresponding to different types of spatial structure according to the spatial feature points of the reference images;
    optimizing the spatial structure groups respectively by the computer device with a point distribution module to decide the feature models with respective spatial reference feature points; and
    analyzing the initial image by the computer device with the spatial structure analyzing module to calculate the spatial initial feature points.

14. The calculation method of claim 11, wherein the reference feature points of the plurality of feature models are face reference feature points and the initial feature points of the initial image are face initial feature points.

15. The calculation method of claim 14, further comprising:
    analyzing each of the reference images by the computer device with a face detecting module to calculate a plurality of face feature points of each of the reference images and divide the reference images into a plurality of face groups corresponding to different quantity of faces according to the face feature points of the reference images;
    optimizing the face groups respectively by the computer device with a point distribution module to decide the feature models with respective face reference feature points; and
    analyzing the initial image by the computer device with the face detecting module to calculate the face initial feature points.

16. The calculation method of claim 11, further comprising:
    calculating an estimated foreground distribution proportion of the estimated image by the computer device; and
    comparing by the computer device a difference between the estimated foreground distribution proportion and a statistical foreground distribution proportion stored in the computer device to decide an estimated field of view of the estimated image.

17. The calculation method of claim 16, further comprising:
    analyzing each of the reference images by the computer device with a foreground segmentation module to calculate a foreground distribution proportion of each of the reference images;
    calculating the statistical foreground distribution proportion by the computer device based on all of the foreground distribution proportion; and
    analyzing the estimated image by the computer device with the foreground segmentation module to calculate the estimated foreground distribution proportion of the estimated image.

18. The calculation method of claim 11, further comprising:
- calculating the three-dimensional coordinates of the reference feature points of the initial image by the computer device based on a correspondence relationship between the initial feature points of the initial image and a plurality of feature points of at least one approximate image; and
- the at least one approximate image corresponds to an approximate camera location and an approximate camera pose, which approximate to the initial camera location and the initial camera pose respectively.

19. An image-providing method comprising the calculation method of claim 11, wherein the image-providing method further comprises:
- providing the initial image by a camera based on the initial camera location and the initial camera pose and providing the estimated image by the camera based on the estimated camera location and the estimated camera pose, respectively;
- adjusting the camera to the initial camera location and the estimated camera location respectively by a location adjusting device; and
- adjusting the camera to the initial camera pose and the estimated camera pose respectively by a pose adjusting device.

20. The image-providing method of claim 19, further comprising:
- calculating an estimated foreground distribution proportion of the estimated image by the computer device; and
- comparing by the computer device a difference between the estimated foreground distribution proportion and a statistical foreground distribution proportion stored in the computer device to decide an estimated field of view of the estimated image, wherein the camera provides the estimated image based on the estimated camera location, the estimated camera pose, and the estimated field of view in the step of providing the estimated image.

* * * * *